(12) United States Patent
Belmarch et al.

(10) Patent No.: US 8,821,231 B2
(45) Date of Patent: Sep. 2, 2014

(54) FANTASY SPORT AUCTION DRAFT APPLICATION

(71) Applicant: Yahoo! Inc., Sunnyvale, CA (US)

(72) Inventors: Ron Belmarch, Los Angeles, CA (US); Ed Lu, Los Angeles, CA (US); Joseph Trdinich, San Jose, CA (US); Edwin Pankau, Manhattan Beach, CA (US); David Geller, Los Angeles, CA (US); Dave Pawson, San Mateo, CA (US); Paul Cameron, Strathroy, CA (US); Shaelyn Clements, Los Angeles, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/898,408

(22) Filed: May 20, 2013

(65) Prior Publication Data

US 2013/0267313 A1    Oct. 10, 2013

Related U.S. Application Data

(63) Continuation of application No. 12/888,390, filed on Sep. 22, 2010, now Pat. No. 8,475,249.

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC .................................. 463/2; 463/29; 463/42

(58) Field of Classification Search
USPC ................................................ 463/2, 29, 42
See application file for complete search history.

(56) References Cited

U.S. PATENT DOCUMENTS

2007/0054718 A1*   3/2007   Del Prado ........................ 463/1

* cited by examiner

*Primary Examiner* — William M. Brewster
(74) *Attorney, Agent, or Firm* — Martine Penilla Group, LLP

(57) ABSTRACT

Methods and system include obtaining attributes of athletic players from one or more sources. The attributes define statistics of the athletic players. Minimum requirements are determined for teams organized in a group. A listing is generated for each team in the group. The listing includes a plurality of entries wherein each entry is configured to present attributes of an athletic player or a team that is part of the group. Select ones of the plurality of entries in the listing are static and select ones of the entries are dynamic. The entries that are static are used to provide minimum requirements defined for each team in the group and the entries that are dynamic are used to provide attributes of the teams or the athletic players. The dynamic entries are adjusted during a drafting process to provide current status of the teams and the athletic players.

17 Claims, 11 Drawing Sheets

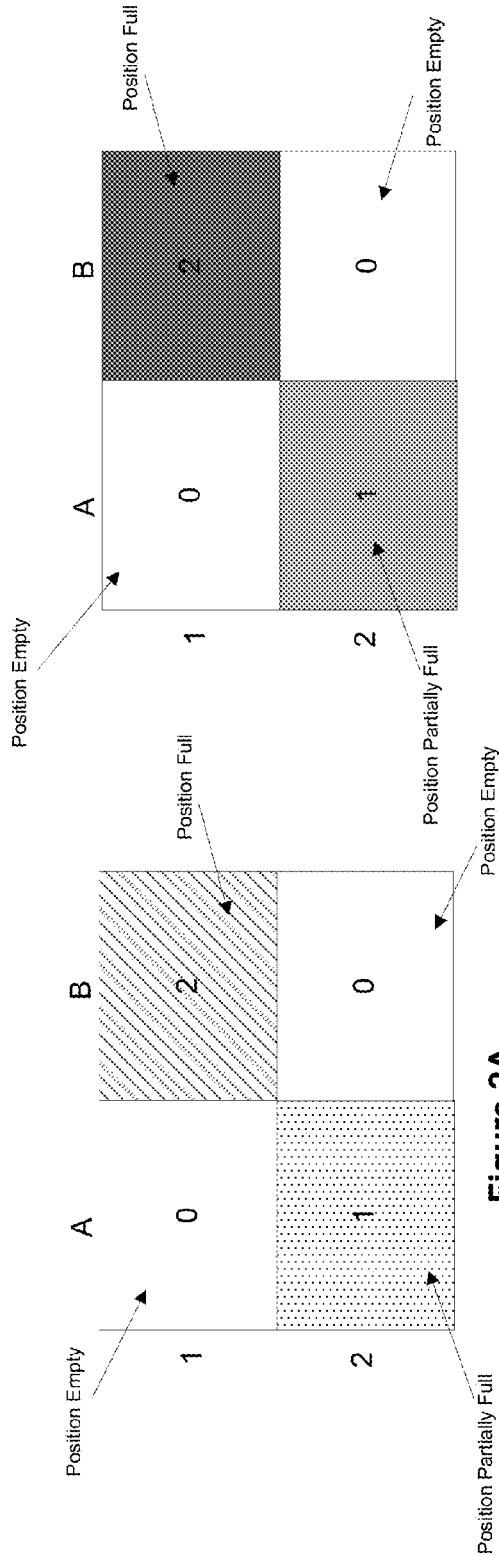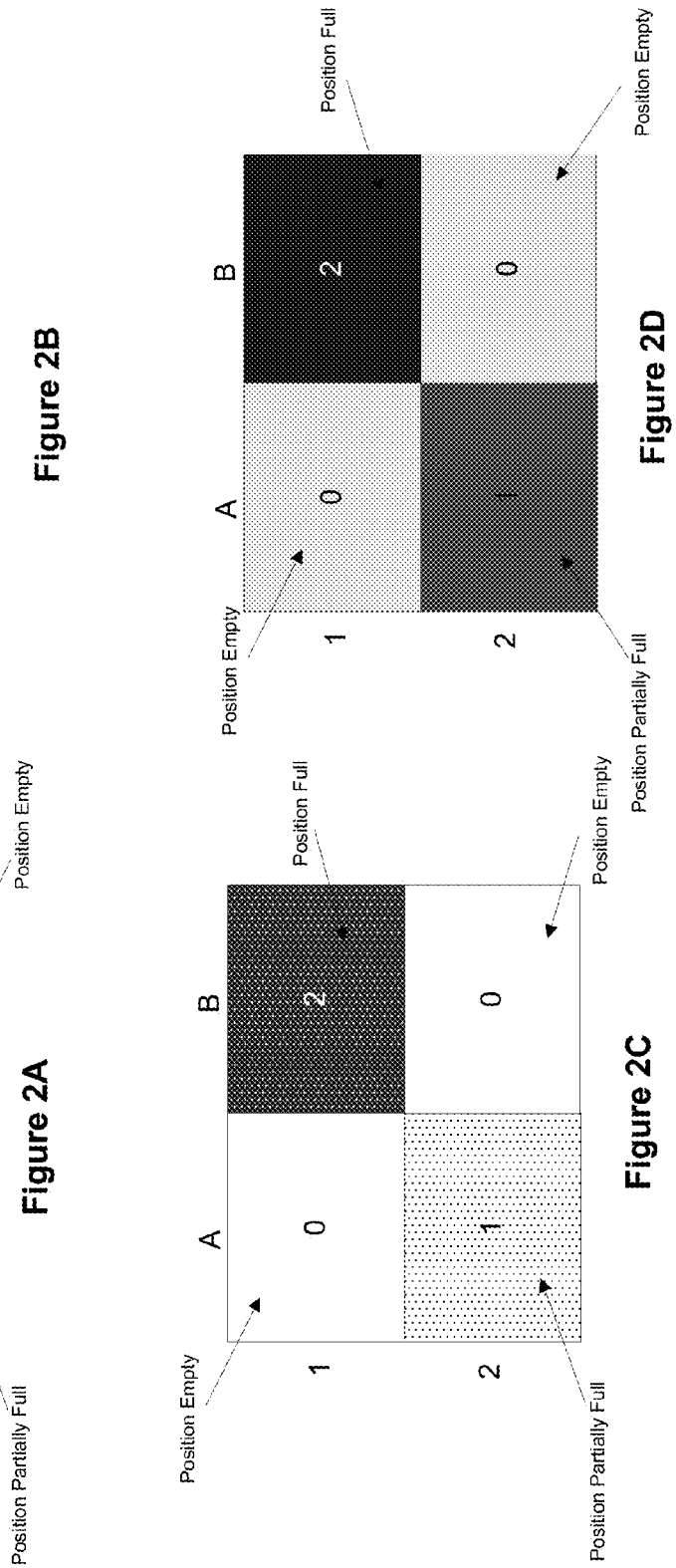
Figure 2A
Figure 2B
Figure 2C
Figure 2D

FANTASY SPORT AUCTION DRAFT APPLICATION

CLAIM OF PRIORITY

This application claims priority as a continuation application, under 35 U.S.C. §120, of prior U.S. patent application Ser. No. 12/888,390, entitled "FANTASY SPORT AUCTION DRAFT APPLICATION ROSTER PREVIEW GRID," filed on Sep. 22, 2010, (issued as U.S. Pat. No. 8,475,249 with a issue date of Jul. 2, 2013) which is incorporated herein by reference in its entirety.

BACKGROUND

1. Field of the Invention

The present invention relates to presenting information during a draft, and more particularly, to presenting attributes of a plurality of players and a plurality of teams in a roster grid.

2. Description of the Related Art

Interest in various sports has grown in recent years. With the advent and growth of the Internet, sports and especially, fantasy sports have evolved into a hobby for millions of users due to the broad reach of the Internet and the exponential growth of sports fan base across the world. Fantasy sport is a game where participants act as fantasy team managers/owners with each participant building a team of players that competes with other similarly built teams based on the statistics generated by individual players or teams of a specific professional sport.

Sports fans across the world emulate the actual professional sports by participating in online draft periodically in which each user picks players to build his/her team. One of the common type of draft is a standard online draft. The standard online draft is one of the easier and widely available draft type for users to participate in. In standard online draft, users acting as team managers coordinate a specific date/time to be online and drafting. Each team takes turns in drafting players. Another common type of draft that is popular with the sports fans is an auction draft. Auction draft is usually preferred by users that have more experience playing online fantasy draft. In the auction draft, each user is provided with a specific budget with which the user builds his/her team. Each user is allowed to nominate as well as bid on players on the "auction block". During a game season, each player is awarded points based on their performance in the professional sport and the fantasy team with the most points is declared a winner. Auction style drafting is popular with experienced users over other styles of drafting as it generates a level of competition and excitement during the draft process and instant gratification once the user successfully drafts the player(s) to his team.

In order for the user to build a winning team, the user has to be able to think fast and be cognizant of not only his/her own team but also the status of the roster of other teams in a league in which the user is a member as well as the various players statistics who are or will be on the auction block, all at the same time. Knowledge of the other teams roster would aid the user in developing strategies for building his/her own team during the actual draft. Conventional draft applications allowed the user to view the statistics of each of the players and each of the teams one at a time. The problem with conventional draft applications is that it was time consuming and the user had to be able to retain all the information gathered over time. Further, such information tend to change based on the updates to the players or the teams statistics adding additional burden on the user. In a time driven application, such as the auction draft, the user has very little time and does not have the luxury to do in-depth timed research during the draft.

It would be beneficial for the user to be able to gather the information on the players and the teams in a quick manner and be able to compare the status of all the teams in a league in order to make fast and informed decision during the draft.

It is in this context that the embodiments of the invention arise.

SUMMARY

Embodiments of the present invention provide methods, system and computer readable medium for generating a listing that presents a plurality of attributes of a plurality of players and plurality of teams simultaneously in a clean, concise and efficient manner. Attributes of the players are received from one or more sources and populated in a database. Any updates to the players' attributes or the teams' attributes during the draft are received into system memory and updated to the database over time. The database and the system memory are queried to retrieve updated status of the plurality of attributes of the plurality of players and the plurality of teams. A listing is generated for the plurality of teams and updated in substantial real-time to reflect the changes during the draft. The listing provides updated status of the players and teams attributes of all the teams at a glance so as to enable a user to quickly compare the status of all the teams and determine which teams may potentially bid for the player currently being auctioned and which player to nominate for draft. The listing provides such information on the players and teams in a concise manner that can be rendered on a single screen so as to enable a user to quickly comprehend the details and make fast decisions during the draft.

It should be appreciated that the present invention can be implemented in numerous ways, such as, methods, systems and an apparatus. Several inventive embodiments of the present invention are described below.

In one embodiment, a method is disclosed. The method includes obtaining attributes of athletic players from one or more sources. The attributes define statistics of the athletic players. Minimum requirements for teams organized in a group are determined. A listing for each team in the group is generated for rendering at a display. The listing includes a plurality of entries. Each of the plurality of entries is configured to present attributes of an athletic player or attributes of a team that is part of the group. The listing includes select ones of the plurality of entries that are static and select ones of the plurality of entries that are dynamic. The entries that are static are used to provide minimum requirements defined for each team in the group. The entries that are dynamic are used to provide the attributes of the teams and attributes of the athletic players. The entries that are dynamic are adjusted during a drafting process to provide current status of the teams and the athletic players.

In another embodiment, a system is disclosed. The system includes a memory to store programming logic of an application used for providing a listing for teams organized in a group and to store team statistics for the teams in the group. The system also includes a processor for executing the application used for providing the listing for the teams. The application includes a draft module that is configured to interact with one or more sources over a network to obtain attributes of athletic players, wherein the attributes define statistics of the athletic players. The draft module is also configured to obtain minimum requirements for the teams by querying the team statistics of the teams stored in the memory. The application also includes a listing generator module configured to generate a listing for each team in the group for rendering at a display. The generated listing includes a plurality of entries with each entry configured to present attributes of an athletic player or attributes of a team in the group. Select ones of the plurality of entries are static and select ones of the plurality of entries are dynamic. The entries that are static are used to provide minimum requirements defined for each team in the group and the entries that are dynamic are configured to provide attributes of the teams and the athletic players. The entries that are dynamic are configured to be adjusted during a drafting process to provide current status of the teams and the athletic players.

In yet another embodiment, a computer program stored in a non-transitory computer-readable medium is disclosed. The computer program includes program instructions for obtaining attributes of athletic players from one or more sources, wherein the attributes define statistics of the athletic players; program instructions for determining minimum requirements for teams organized in a group; and program instructions for generating a listing for each team in the group for rendering at a display, the listing having a plurality of entries, each of the plurality of entries configured to present attributes of an athletic player or attributes of a team that is part of the group. The listing includes select ones of the plurality of entries that are static and select ones of the plurality of entries that are dynamic. The entries that are static are used to provide minimum requirements defined for each team in the group and the entries that are dynamic are used to provide the attributes of the teams and attributes of the athletic players. The entries that are dynamic are configured to be adjusted during a drafting process to provide current status of the teams and the athletic players.

Thus, the embodiments of the invention provide an effective means for tracking draft status of different teams organized in a group during a draft. The listing provides attributes of both the athletic players and the teams in the group in a concise format so that a user can be cognizant of the status of his own team and of the other teams in the group in order to determine which teams are more likely and which ones are less likely to require an athletic player that is nominated during a drafting process. The listing includes plurality of entries that provide information related to the athletic players and the teams in the group. Each entry in the listing is configured to expand to provide additional information associated with the corresponding athletic players or the teams. Based on the status, a user can intelligently decide on which athletic player to nominate, which athletic player to draft, how much to bid and which athletic player to ignore.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIGS. 2A-2D illustrate various fill indicators for defining the status of each cell in a roster grid, in an embodiment of the invention.

DETAILED DESCRIPTION

Figure 1A:
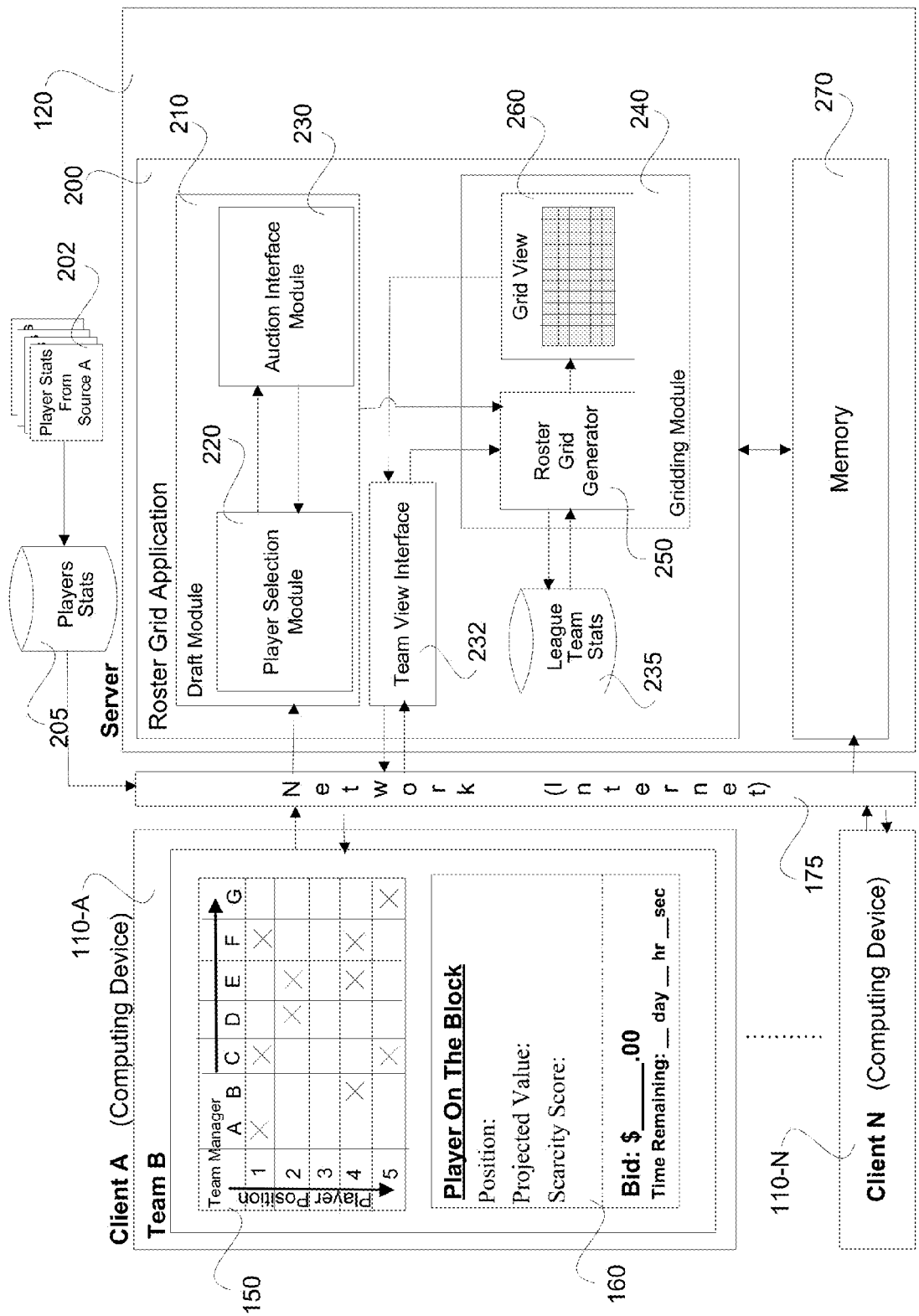
FIG. 1A illustrates a high-level block diagram of a system with a draft application available on a server for presenting plurality of attributes for plurality of players and teams, in one embodiment of the invention.

Broadly speaking, the embodiments of the present invention provide methods, apparatus and systems for generating a roster grid highlighting a plurality of attributes of a plurality of players and plurality of teams. The roster grid provides the information in a plurality of cells in an organized and concise format to enable a user to quickly determine status of his own team as well as the status of other teams. The user can quickly analyze the data provided in the roster grid and make informed decisions on the relative demand for the player, the relative need for the player in the user's own team, which teams could potentially bid for the player and which ones may not. Based on this analysis, the user may be able to decide if he wants to bid and how much he should bid. The various embodiments of the invention provide different ways of presenting the data in the roster grid. Each of the embodiments provides the user with appropriate information to enable the user in making informed but quick decisions on the draft.

Towards this end, the embodiments define a system in which a user connects to a server executing a draft application. The draft application is configured to receive a plurality of attributes of the plurality of players and the plurality of teams and any updates to the players and/or teams attributes. The players and teams attributes are updated onto a database. The database is queried to retrieve updated status of the plurality of attributes and a roster grid of the plurality of teams is generated for rendering at a client. The roster grid provides the plurality of attributes associated with both the players and the teams in an organized and concise format. The information in the roster grid can be analyzed by a user to determine various teams draft status, demand for a particular player, status of the user's own team in order to decide whether the user would like to participate in a specific draft or not. Any updates to the plurality of attributes are done in substantial real-time and the roster grid is dynamically updated to reflect the updated status of the attributes associated with the teams and players.

In addition to the roster grid, the draft application provides at least a portion of the attributes of a player nominated for draft, alongside the roster grid to assist the user in further researching a player that is either currently being drafted or is nominated for a draft or for consideration for likely nomination. In addition to the roster grid and information about a player, the draft application also provides current auction information to indicate the progress of the auction during the draft. As will be described in the various embodiments in conjunction with the drawings, the roster grid provides attributes of the players and teams to empower a user with necessary and sufficient information to make intelligent decision during a draft.

It should be understood that the draft application can be in the form of a code running on one or more servers, or can be embedded in a hardware or firmware. The draft application does not have to be integrally coupled to the server but be available to the server. Towards this end, the various embodiments of the invention will now be described in details with reference to the drawings.

FIG. 1A illustrates a high-level block diagram of a generic computer system used for generating a roster grid, in one embodiment of the invention. Although the embodiment has been described with reference to a generic computer system, it should be noted that the computer system embodying a draft application could be specially constructed for executing the draft application. Additionally, the draft application may be incorporated in a computer readable medium that can be read and executed by a computer system. Referring back to FIG. 1A, the computer system includes one or more client computing devices 110-A-110-N that is used to request and render a roster grid providing attributes of a plurality of players and plurality of teams. The client interacts with a server computing device 120 over a network 175, such as an Internet. The server computing device 120 is equipped with a draft application, otherwise termed roster grid application 200 and a system memory 270. The draft application 200 is configured to receive a request from anyone of the plurality of clients 110-A through 110-N and generate a roster grid 150 with a plurality of attributes of a plurality of players and plurality of teams. The roster grid 150 with the details on the players and teams is returned to the client 110-A in response to the request from the client 110-A. The generated roster grid includes any and all updates available for one or more attributes of one or more players and one or more teams.

To assist in the generation of the roster grid, the draft application 200 may include a plurality of modules. For instance, the draft application may include a draft module 210 and gridding module 240. The draft module 210, in turn, includes a player selection module 220 to provide attributes of one or more players so that the one or more players can be selected for the draft and an auction interface module 230 to interact with the player selection module 220. The player selection module 220 queries and receives one or more attributes and updates to the one or more attributes associated with the one or more players from a player stats database (also termed "player database") 205. The player database 205 may be part of the server computing device 120 or may be accessible by the draft application executing in the server computing device 120. The player database 205 may receive player attributes from a variety of sources 202 including, but not limited to, CNN™, ESPN™ (for sports related player), Yahoo!™, etc., from major league sports (for sports related player) or other relevant sources that provide the information on the one or more players. The player attributes may also be received from the ongoing draft.

The auction interface module 230 is configured to provide an auction interface for rendering at the client, receive and verify the bids for the selected one or more players during the draft and to interact with the player selection module 220 to retrieve and update attributes associated with the players. One or more attributes of the players may also be used to compute additional attributes for the respective players. The computed additional attributes may be rendered alongside the other attributes of the player during the draft to aid the teams to make intelligent and informed decisions. The additional attributes may be rendered in the roster grid alongside the players attributes or may be rendered outside the grid alongside the roster grid. In one embodiment, the additional attribute may include a probability score (otherwise termed projected value) for a player. The probability score (projected value) is defined as a likelihood of the player being drafted during a current draft. In one embodiment, the projected value is defined as a function of one or more attributes of a player and one or more attributes of a team and is dynamically updated as and when the one or more related attributes of the team and/or player are updated.

In addition to the player selection module 220 and the auction interface module 230, the draft application may include a gridding module 240. The gridding module 240 interacts with the player selection module 220 and the auction interface module 230 to receive updated plurality of attributes of the plurality of players and one or more updated attributes of the plurality of teams. The gridding module 240 also interacts with a team database 235, such as league team stats database (also termed league teams database), to obtain plurality of attributes of the plurality of teams for which the roster grid is generated. In one embodiment, the teams may belong to a specific sports league and the attributes of the teams would relate to the league. The gridding module 240 may also interact with a team view interface module 232. The team view interface 232 interacts with the client 110-A through the network 175, to receive a request and return an appropriate roster grid view. In one embodiment, a customized roster grid 150 may be generated and returned to the client 110-A in response to the request.

The roster grid 150 returned by the draft application is rendered at the client 110-A. The information in the roster grid 150 is analyzed by a user and used during bidding in an auction draft. In one embodiment, updates from the ongoing auction draft at one or more clients are stored in a system memory and updated to the database over time. The draft application, in this embodiment, will query the database to obtain attributes of players and teams and will query the system memory 270 to obtain the updated information of the players and teams received from one or more clients during the draft and populate the roster grid with the information from the queries in substantial real-time. The system memory includes cache memory to store frequently used data of the ongoing draft. The usage of cache and system memory helps the draft application in providing fast and up-to-date information in the roster grid to the user during the user's draft session without having to go through the operation of updating the database and then querying the database. It should be noted that the benefits of the cache memory is fully utilized so long as the user does not disconnect from his/her current session. In this embodiment, if a user gets disconnected from the draft module during the draft, the user can reconnect and the information from the database and the system memory will populate the roster grid rendered at the user's client device to reflect the most up-to-date information on the players and teams and re-populated the cache memory. The newly re-populated cache memory is then used during the auction draft to provide fast and up-to-date information on the frequently used parameters of the players and teams at the roster grid. In another embodiment, the updates received from the clients at the system memory are uploaded to the database in substantial real-time by the draft application and the database is then queried to populate the roster grid. Irrespective of the process followed in populating the roster grid, the rendered roster grid provides the necessary and updated information to the user during the draft so that the user can quickly analyze and strategize during the auction draft process.

Figure 3A:
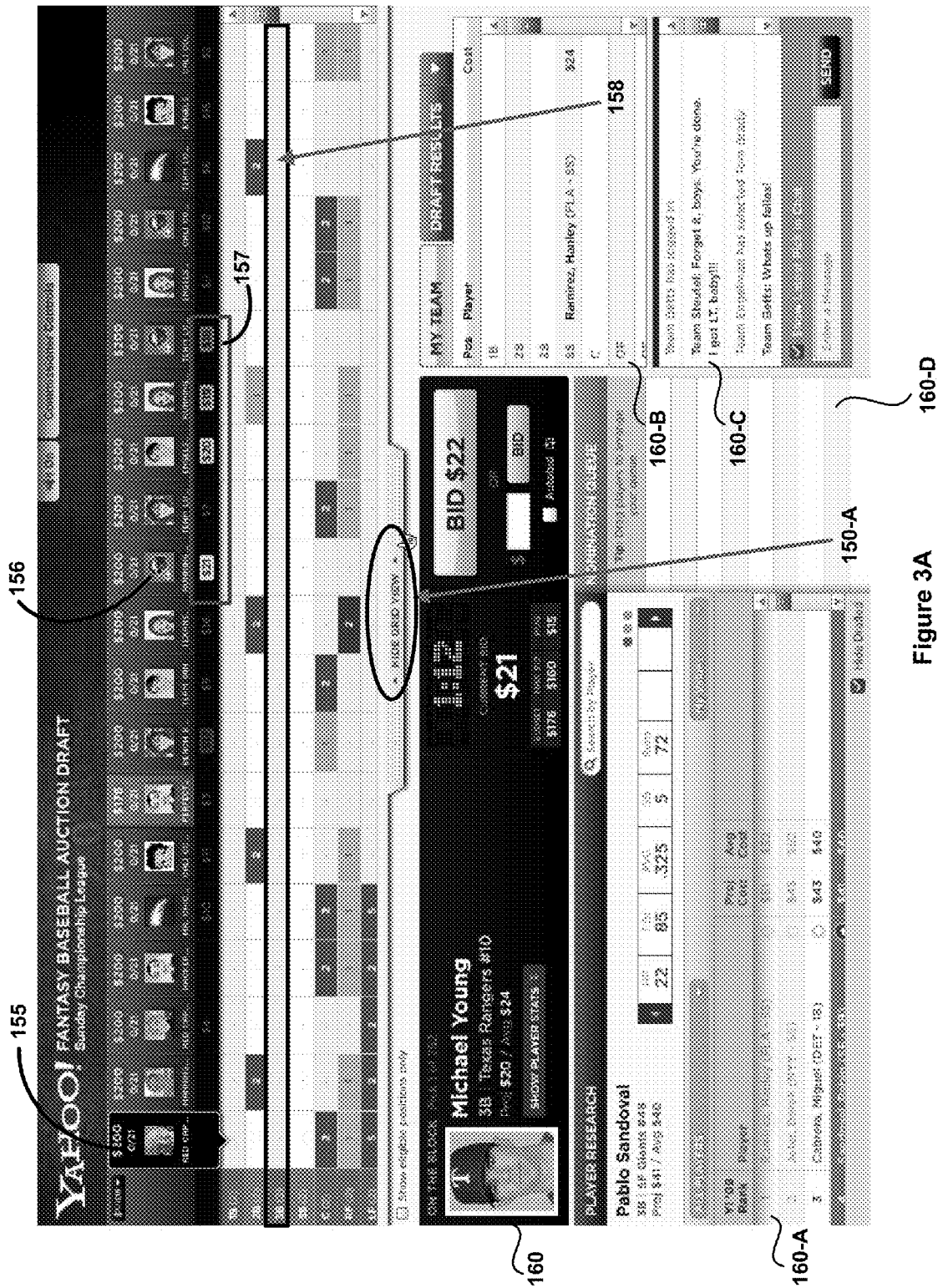
FIGS. 3A, 3A-1 and 3A-2 illustrate exemplary roster grid related to a draft generated using the draft application, exhibiting full view of the roster grids along with other details, in one embodiment of the invention.
Figures 1, 3A:
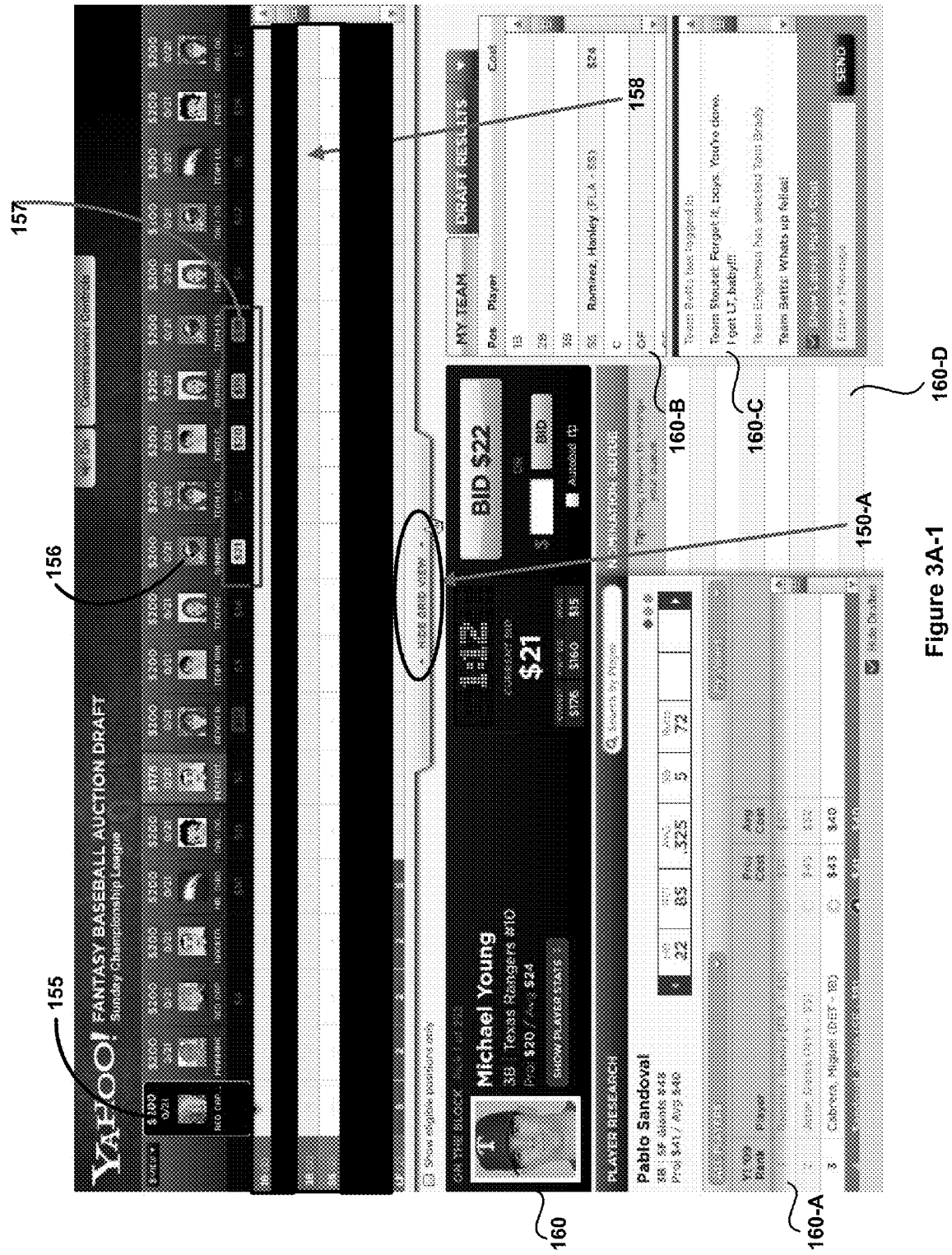
Figures 2, 3A:
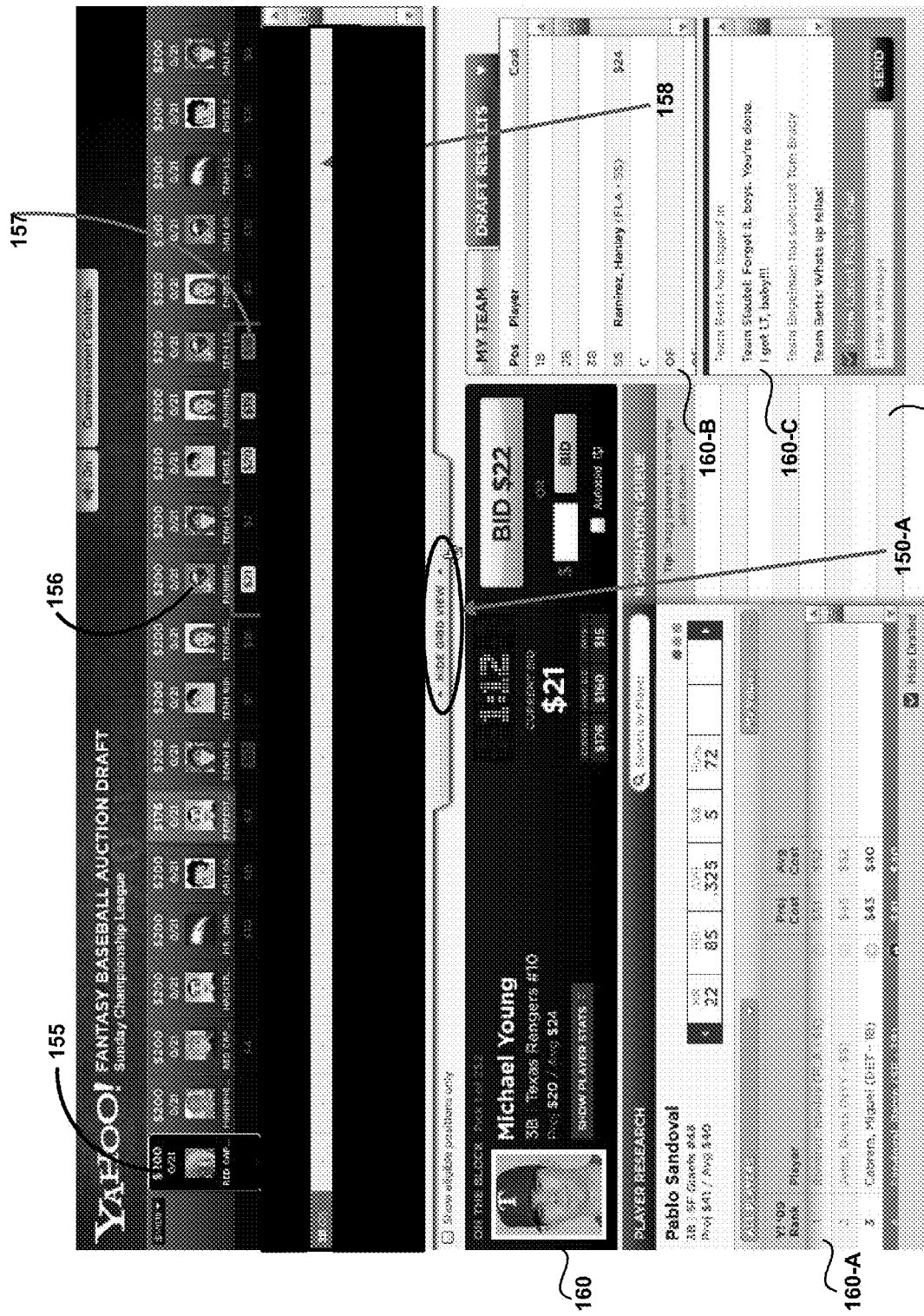

In one embodiment, the roster grid 150 returned to each user is customized for the specific user's needs or requests. For instance, the draft application may be used during a fantasy sports draft for a specific sport, such as baseball, football, basketball, or hockey, in a specific league. In this instance, Client A may request for a detailed roster grid showing all the teams, all player positions for the league and status of all player positions. In such a case, the draft application returns a comprehensive roster grid as shown in FIG. 3A. Another client, client B, may request to view only specific player positions for the league, such as the player positions that do not have any eligible positions filled yet, in which case the draft application returns a roster grid as shown in FIG. 3A-1. Alternately, a client C may request to view only the eligible position(s) played by a player that is currently "on-the-block", in which case, the draft application returns a roster grid as shown in FIG. 3A-2. It should be noted that a player is eligible to play at least one eligible position and may sometimes be eligible to play more than one eligible position in a team. In such cases, the roster grid returned for the client C may include more than one row. In still another embodiment, the client A may request to view only open positions for all teams and the draft application would return a roster grid that shows only the player positions which are not completely filled by all the teams. The client may also request to view the draft status of specific teams in the league and the draft application may return a roster grid with only those teams. Thus, based on the type of view requested by the client, the gridding module 240 generates and returns appropriate roster grid 150 for rendering at the respective client. In addition to the roster grid, the draft application may also return attributes of players currently being drafted or can be potentially drafted along with any additional attributes for rendering at the client. Such information may be presented alongside the roster grid as shown in player information box 160. The additional attributes of the players can be used to conduct research on the players before or during the auction draft.

Figure 1B:
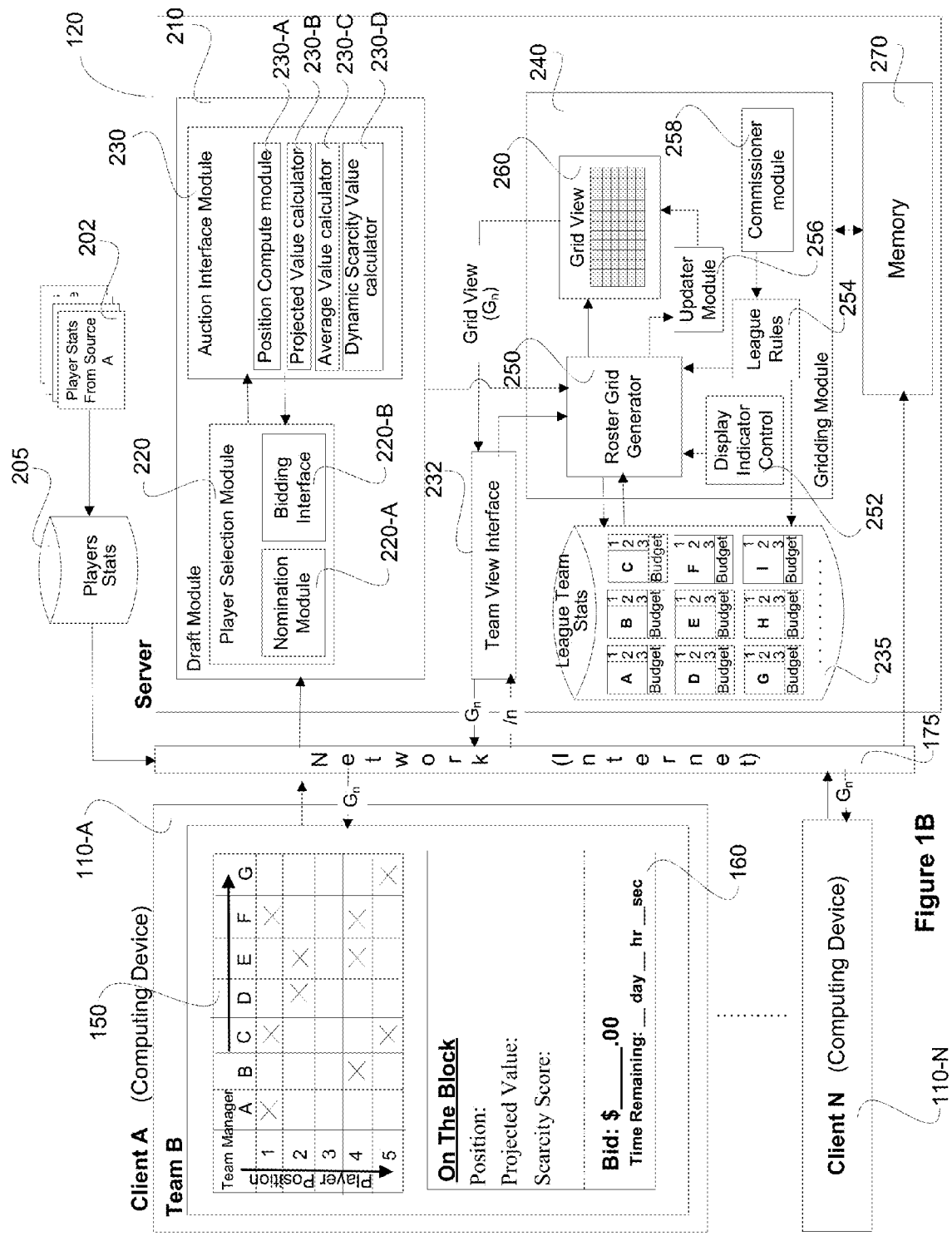
FIG. 1B illustrates a detailed block diagram of the various modules within the draft application, in one embodiment of the invention.

To better understand the function of the draft application, attention is now directed to FIG. 1B. FIG. 1B illustrates the various modules available within the draft module 210 and gridding module 240 and their role in generating the roster grid. As mentioned earlier with reference to FIG. 1A, the draft application includes a player selection module 220 for identifying, querying and updating one or more attributes of the plurality of players. In one embodiment, the players may be part of a particular professional sport and the attributes may mirror their statistics including any accomplishments in the particular professional sport. It should be noted herein that the draft application is not restricted to generating a roster grid for a particular sport or fantasy sport but can be extended to other fields where trading, selling or exchange of goods/services is involved. In the instance where the draft application is used in other fields, the player may represent a particular item/good/service that is traded/exchanged/sold and the teams may be represented by a plurality of patrons that are interested in bidding for the items/goods/services. For simplicity purposes, the current embodiments will be described with reference to a particular fantasy sport draft, such as baseball, with the general understanding that the teachings of the various embodiments described herein can be extended to other fields.

Referring back to FIG. 1B, the draft application includes a plurality of modules, such as a player selection module 220, an auction interface module 230 and a gridding module 240. Each of the listed modules may include additional modules. For instance, the player selection module 220 may include a nomination module 220-A and a bidding interface module 220-B. Similarly, the gridding module 240 may include a roster grid generator module 250, an updater module 256 and a display indicator control module 252, to name a few. The list of modules is exemplary and should not be considered restrictive. More or less number of modules may be available to generate the roster grid.

The player selection module 220 may be used to identify, query and/or update one or more attributes of a plurality of players that are part of a league. The player selection module 220 interacts with a database, such as a player stats database 205, to obtain, query and update one or more of the player attributes. The player stats database 205, in turn, may interact with a plurality of relevant sources 202 to receive details and updates to one or more attributes of the one or more players in the league. In case of a sports draft, the relevant sources may include sports related sources, such as CNN™, ESPN™, Yahoo!™ Sports, etc. In case of trading of an item, the relevant sources may include manufacturers, dealers, analysts, reviewers, etc. Referring back to the sports draft, the plurality of player attributes for the plurality of players received from the plurality of sources are dynamically updated to the player stats database 205. The player selection module 220 queries the updated player stats database 205 to obtain plurality of attributes of the plurality of players.

The nomination module 220-A within the player selection module 220 is used to receive the information associated with the one or more players in the league from the player selection module 220. In one embodiment, the nomination module 220-A receives requests from the client 110-A for a specific player in the league and retrieves the attributes for the specific player in response to the request. Some of the attributes associated with a player include player name, eligible position played, player statistics, team name associated with the player, etc. The request may be a nomination or likely nomination of a specific player for the draft. For instance, a user on the client may select a specific player and review the player's statistics and to determine if the specific player can be nominated for the draft. The user, in this instance, acts as a team manager and manages the formation of his/her own team and nominates a player for the draft. The user may request to review the specific player's attributes prior to deciding on nominating the specific player. In this instance, the nomination module 220-A receives the request for information on the specific player and retrieves the appropriate attributes on the specific player from the player selection module 220, which obtains the information by querying the player stats database. In addition to retrieving the plurality of attributes for the nominated player, the nomination module 220-A may retrieve one or more attributes of the plurality of teams in the league by interacting with a league team database in response to the requests from the client 110-A.

The bidding interface module 220-B in the player selection module 220 provides an interface between the player selection module 220 and the auction interface module 230. The interaction between the auction interface module 230 and the player selection module 220 enables one or more player attributes to be exchanged between the two modules so that one or more of the additional attributes associated with the player may be computed for rendering alongside the roster grid. The additional attributes provide more information for a user during the auction draft process.

During the draft, in one embodiment, a team is eligible to nominate a player when the team has budget available for the draft. When a specific team nominates a player, the nomination module 220-A verifies to see if the nominated player is already part of the specific team. If the nominated player is part of the specific team, the nomination module 220-A will not accept the nomination for the draft. The nomination module 220-A ensures that the player who is nominated for the draft is not owned by any of the teams in the league prior to accepting the player's nomination. Additionally, in one embodiment of the invention, the bidding interface module 220-B will verify to see if the nominating team has an available budget prior to accepting nomination of the player by the team for auction draft. Stating the obvious, the teams with non-zero budgets are eligible to bid on a nominated player and teams with zero budgets are ineligible in bidding on the nominated player. Thus, when a team bids for a player, the bidding interface module 220-B will verify to see if the team has the budget for the placed bid in order to consider the bid during the draft. Upon verification, the bidding interface module 220-B will accept the bid from the team having the necessary budget. Upon acceptance of the highest bid for the nominated player, the appropriate team's budget is adjusted to reflect the draft.

The additional attributes for the specific player/teams are computed using one or more computing modules within the Auction Interface Module 230. The computed additional attributes are forwarded to the gridding module 240 for rendering in or alongside the roster grid 150 based on a roster grid view 260 requested by the Client A. In one embodiment, the additional attribute may include a probability score or projected value for the specific player computed using a projected value calculator 230-B. As mentioned earlier, the probability score (projected value) is a measure of likelihood of the specific player being drafted when nominated. The probability score is computed using one or more attributes of the specific player and the one or more attributes of the teams in the league. In one embodiment, the probability score is computed as a function of scarcity of players to play a specific position, need for the player in the teams based on number of players drafted for the particular position the player is eligible to play and budget required for drafting the player.

The probability score, in one embodiment, may act as a metric for perceiving increased value of one or more players in the teams. For instance, a team nominating the player may use the probability score to determine the demand for a nominated player across all the teams in a league. The demand for the nominated player may be based on the position played or specific talent of the player. Based on the perceived demand, the team nominating the player may define a minimum bid value for the player. For example, a player who is a left-handed pitcher might be in greater demand amongst other teams than a right-handed pitcher. Thus, using the probability score as a metric, a nominated team may be able to place a minimum bid value required during the draft while the bidding team may be able to strategize in placing an appropriate bid.

In another embodiment, the additional attributes may include a dynamic scarcity value for a specific player. During the draft, a dynamic scarcity value calculator 230-D within the auction interface module 230 may interact with the player selection module 220 to compute a dynamic scarcity value for a specific player that is currently nominated for draft. The player selection module 220 interacts with both the player stat database 205 and a team database 235 to request and receive one or more attributes of the nominated player and one or more attributes of the teams participating in the draft to compute the dynamic scarcity value in substantial real time for the nominated player. In one embodiment, the dynamic scarcity value may be used to predict the demand for the nominated player qualified for an eligible position and can be computed as a ratio of number of players qualified to play the eligible position played by the nominated player that are currently eligible for draft to the number of open slots for the eligible position waiting to be filled in the plurality of teams.

In one embodiment, the nominated player may be eligible to play a plurality of positions. In this embodiment, a position compute module 230-A within the auction interface module 230 may identify the specific position the nominated player is chosen to play and then the dynamic scarcity value calculator uses the identified position to compute the dynamic scarcity value for the nominated player for the chosen eligible position. In one embodiment, the position compute module 230-A may choose the eligible position for which the statistics of the player are most favorable. Other ways to decide the eligible position may be utilized so long as the dynamic scarcity value can be computed for the most eligible position for the nominated player.

In yet another embodiment, the additional attribute may include an average value. The average value may be for the nominated player or may be for the eligible position played by the nominated player. In one embodiment, the average value is based on the attributes of the nominated player and can be computed in substantial real-time as a function of the nominated player's statistics and the demand for the nominated player based on the nominated player's statistics using an average value calculator 230-C within the auction interface module 230. In another embodiment, the average value is based on the attributes of the teams and can be computed as a function of dynamic scarcity value for the eligible position and the needs of the various teams.

The auction interface module 230 and the player selection module 220 within the draft module 210 of the draft application interact with a team database 235 to obtain one or more attributes of the plurality of teams. Some of the team attributes obtained for each team may include team identifier, total number of eligible positions, list of eligible positions, nominated players for each position, eligible positions that are still open, eligible position that are filled, team manager, original budget for the team, available budget for the team. The available budget for the team is a dynamic value that is being constantly updated during the course of the auction draft. The aforementioned list of team attributes is a sample and should not be considered exhaustive. In one embodiment, the auction interface module 230 may query and obtain the budget available for each team in order to determine one or more of the additional attributes of the team/player. The additional attributes are transmitted to the gridding module 240 for rendering in or alongside the roster grid 150 to help a user in making informed decision during the draft.

Referring back to FIG. 1B, the roster grid generator module 250 within the gridding module 240 is used to generate a comprehensive roster grid 150 with the plurality of attributes of players and teams. In one embodiment, a plurality of views of roster grid are generated based on the one or more requests received from the one or more clients 110-A, 110-N. The roster grid generator 250 interacts with a plurality of modules and databases to obtain the information required for generating the roster grid. In one embodiment, the roster grid generator 250 interacts with the team database 235 to obtain the plurality of attributes of each of the teams in a league and with a league rules module 254 to obtain the minimum requirements for each team in the league, the player stats database 205 to obtain the plurality of player attributes, a team view interface module 232 to obtain the type of view required by a particular client and generates a customized roster grid view 260 according to the specifications. In one embodiment, the league rules module 254 may define a list of eligible positions in each team, minimum number of players required for each position and the number of teams in each league. In one embodiment, the information obtained from the league rules module 254 is used to populate a static portion of the roster grid 150. The customized grid view 260 is returned to the appropriate client for rendering as the roster grid 150. The roster grid generator 250 also interacts with an updater module 256 to obtain any updates to the team, player statistics, grid view and league rules and incorporates the updates in to the roster grid dynamically.

The roster grid generator module 250 may also interact with a display indicator control module 252 to receive indicators to one or more rows and to one or more cells in the roster grid. In one embodiment, the display indicator control module 252 works alongside the updater module 256 and roster grid generator 250 to provide appropriate indicators to one or more rows and one or more cells within the roster grid based on the players currently being drafted or based on the values in each of the cells. For instance, when a player is drafted, the display indicator control module 252 may provide an appropriate indicator for one or more cells of one or more teams associated with the eligible position played by the drafted player based on the draft. The indicators are used to provide visual cues to help a user involved in the draft auction identify a current status of a particular team with respect to the eligible position.

The display indicator control module 252 may use different techniques or schemes to provide visual cues at the appropriate cells/rows, as illustrated in FIGS. 2A-2D. In one embodiment, the display indicator control module 252 may use a color coding or design coding scheme to provide appropriate color or design codes to indicate the current status of the team for the eligible position. For instance, as illustrated in FIG. 2A, when the team does not have any slots filled for an eligible position, the fill code for the cell may be clear white, when the team has partially filled portion of the slots for the eligible position, the fill code for the cell may be dotted and when the team has completely filled all the slots for the eligible position or has exceeded the eligible position's minimum requirements, the fill code for the cell may be slats. Alternately, as illustrated in FIG. 2B, when the team does not have any slots filled for an eligible position, the color code for the cell may be white, when the team has partially filled portion of the slots for the eligible position, the color code for the cell may be light grey and when the team has completely filled all the slots for the eligible position or has exceeded the eligible position's minimum requirements, the color code for the cell may be dark grey. Some additional forms of fill code/color code engaged by the display indicator control module are shown in FIGS. 2C and 2D. The above color/fill coding scheme is exemplary and should not be considered restrictive or exhaustive. Other forms of defining the status of the eligible position for a team may be used so long as the coding scheme provides distinct and appropriate visual cues regarding the status of the eligible positions for the teams. The various techniques used by the display indicator control module are not restricted to the cells in the roster grid but are extended to the rows in the roster grid. The fill/color coding technique for the rows may follow a different scheme than the one followed for the cells or it can follow the same technique as the ones followed for the cells.

In addition to the various modules mentioned above, the gridding module 240 may include a commissioner module 258. The commissioner module 258 may provide control logic to control the draft process. In one embodiment, the commissioner module 258 may provide logic to pause the online draft process. Due to time sensitive nature of the on-line draft process, the pausing of the online draft provides the team managers some room to recover from the intensity of the draft and/or strategize. There could be more than one pause issued by the commissioner module 258 during the online draft process. The pauses can be pre-defined or provided in real-time. In another embodiment, the commissioner module 258 may provide the logic to change one or more league rules. The league rules that may be changed by the commissioner module 258 may include the number of teams in the league, minimum requirements for the eligible position, etc. The changes to the league rules and/or pause command(s) are conveyed to the roster grid generator directly by the commissioner module or through the league rules module so that appropriate actions can be taken by the roster grid generator module during the generation of the roster grid.

The team view interface 232 receives requests from a plurality of clients, 110-A through 110-N, that define the type of roster grid view desired by each of the clients. Each client's roster grid view preference is forwarded to the roster grid generator 250 so as to generate a customized roster grid view 260 for each of the client. The customized roster grid view 260 is forwarded through the team view interface 232 to the appropriate client's computing device for rendering. Any interactions at the roster grid, including selection of a player for draft/nomination, inquiry on statistics of the nominated player, outcome of the auctions, etc., are captured at the client and transmitted to the draft application for appropriate action/processing/updating. As the changes are captured at the client, information in the one or more cells associated with the players or the teams affected by the change are dynamically updated to reflect the changes.

The above list of modules and functionalities are exemplary. Fewer or additional modules may be incorporated in the roster grid application to enable generating a roster grid view 260 that provides comprehensive information on the status of all the teams in the league during the draft.

Figure 3B:
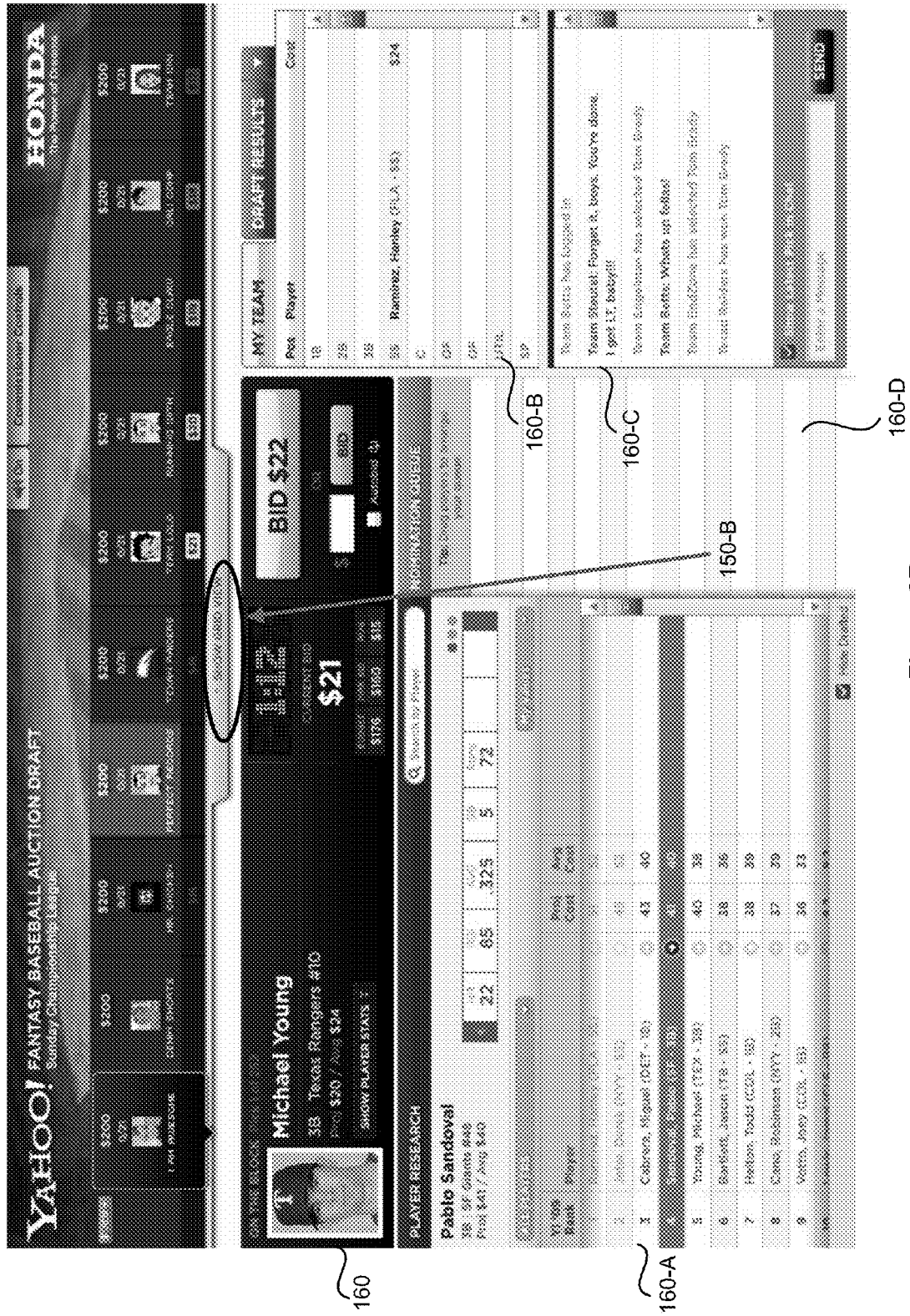
FIG. 3B illustrates a collapsed view of the sample roster grid illustrated in FIG. 3A, in one embodiment of the invention.
Figure 3C:
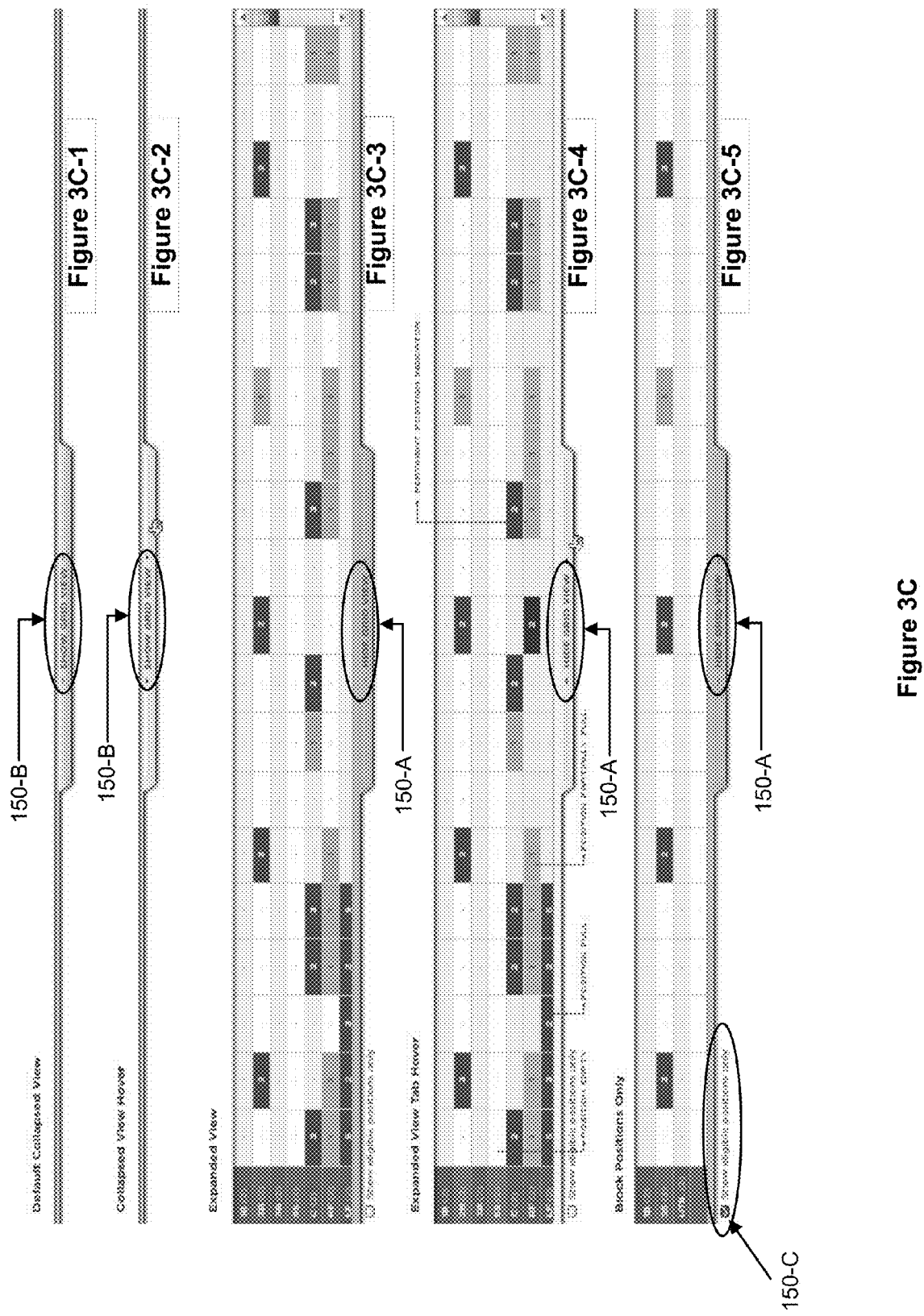
FIG. 3C illustrates various rendering options available to a user for rendering information provided by a draft application, in one embodiment of the invention.
Figure 4:
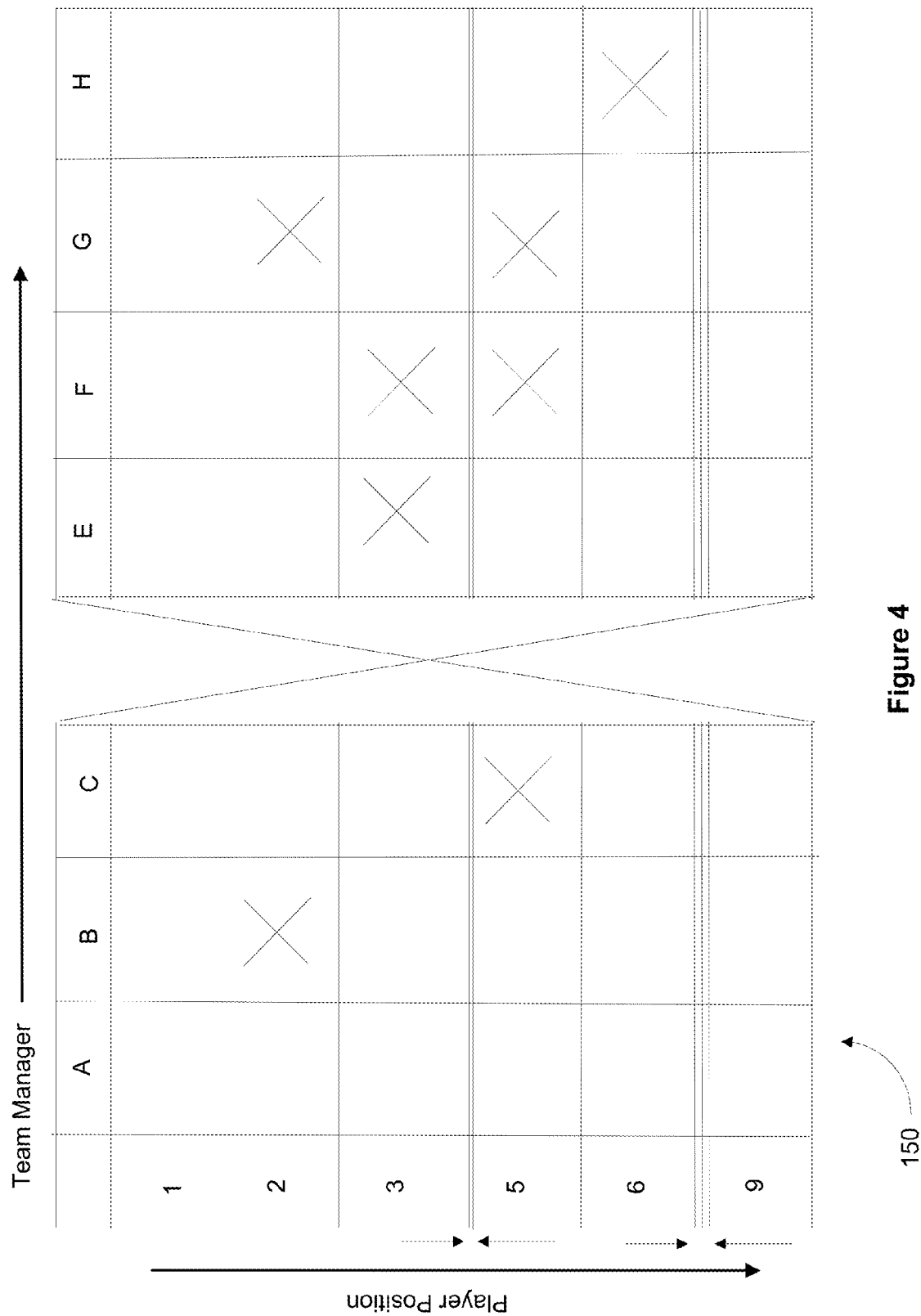
FIG. 4 illustrates an alternate view of the sample roster grid illustrated in FIGS. 3A-3C, in an alternate embodiment of the invention.

FIG. 3A illustrates a comprehensive roster grid 150 generated by the roster grid generator in response to a request from a client. The roster grid 150 provides the status of all the teams in the league including the teams that have all eligible positions filled and teams that have none of the eligible positions filled. As shown in FIG. 3A, the roster grid 150 also shows the various cell indicators activated to provide a fast and visible cue on the status of the teams for each of the eligible positions in the team. The roster grid generator generates one or more customized roster grid views based on the requirements of one or more users. Along with the customized roster grid views, the roster grid generator also provides options to hide/show the roster grid 150. FIG. 3C illustrates some of the options provided at the roster grid by the roster grid generator. In one embodiment, a "hide grid view" button 150-A is provided to enable the user at the client to hide the grid view, as illustrated in FIGS. 3A and 3C-3. The hide grid view button may also be activated when a cursor hovers over the button, as illustrated in FIG. 3C-4. When a user clicks on this button, the roster grid is hidden from view and a second option, such as a "show grid view button" 150-B, is activated to enable a user to expand the grid view for viewing, as shown in FIGS. 3B and 3C-1. The show grid view button may also be activated when a cursor hovers over the button, as illustrated in FIG. 3C-2. In addition to these two buttons/options, the roster grid may also include additional buttons, such as "show eligible positions only" button 150-C, in one embodiment of the invention illustrated in FIG. 3C-5. When a user selects this option/button, only the rows of all eligible positions that are not filled by one or more teams are rendered. In another embodiment, when a user selects the show eligible positions only button 150-C, the roster grid will render only the rows of eligible positions that the current player being drafted is eligible to play. In yet another embodiment, when this option is chosen, only the eligible positions associated with the current nominated player that are fully/partially open and only the teams that have these eligible positions fully/partially open will be rendered, as illustrated in FIG. 4. In FIG. 4, the roster grid shows only those teams whose eligible positions slots are still fully or partially open. Based on the roster grid presented in FIG. 4, a team manager (user) can quickly comprehend that Team D's all eligible slots have already been filled and the team manager does not need to view team D's status. Along similar lines, the eligible positions 4, 7 and 8 have already been filled for all the teams and hence the team manager does not need to view the status of all the teams for those eligible positions. The roster grid view could be further refined to show the cells of only those teams whose slots for the particular eligible position played by the nominated player are empty. Thus, a fully expanded view of the roster grid may be rendered at the client and a user may use the buttons/options to collapse/expand/view the appropriate portions of the roster grid as and when needed so that the user can focus on only the required cells during the draft in order to make quick, informed and strategic decisions.

The roster grid includes a static portion and a dynamic portion. The static portion of the roster grid includes information that are substantially static over the course of the draft and may include information pertaining to the league rules as obtained from the league rules module, such as number of teams in a league for a particular sport, team manager, total or maximum budget available to each team during the draft, total number of positions that make up the team, various eligible positions available in the team, minimum number of eligible spots required for each team. In one embodiment, the static portions are rendered as column and row headers. In addition to the attributes that are rendered in the static portion of the roster grid, the league rules module may provide additional attributes that are not rendered in the roster grid but may be essential or required for each team during the actual draft process, such as a minimum bid value and a maximum bid value that a team can bid during the draft.

In the embodiment illustrated in FIG. 3A, the teams are rendered along columns and eligible positions along rows. In other embodiments, the teams may be rendered along rows and the eligible positions along columns. The cells in the roster grid under each column or row provide information on the status of each of the eligible positions for each team. In addition to the information on the status of each of the eligible positions, each of the cells in the roster grid are associated with a cell indicator to provides easy, fast and visible cues on the status of each of the eligible positions. Additionally, each of the cells that are at least partially filled may provide details on the list of players that are currently drafted for the respective team. In one embodiment, such information includes the respective player's attributes obtained from player stats database. In one embodiment, when a user hovers over a particular cell that is at least partially filled, the details of the players are provided. In another embodiment, when a user clicks on a particular cell that is at least partially filled, the information on the list of drafted players may be presented in a sub-window. The above embodiments for providing information on players drafted for a team are exemplary and other ways of providing information on players drafted for a team may also be used.

Still referring to FIG. 3A, the teams are represented by the respective team managers' names as column header, in one embodiment of the invention. In another embodiment, the names of the teams may be provided in addition to or instead of the respective team managers at the head of each column. Alongside each team's and/or team manager's name, total budget allocated for each team and total number of positions in the team may also be rendered. The information, as indicated earlier, is part of the static attributes of each team, which are at least partly defined by the league rules.

The rows in the roster grid are represented by eligible positions. The roster grid represented in FIG. 3A is shown for a fantasy baseball auction draft. Accordingly, the eligible positions may include $1^{st}$ base, $2^{nd}$ base, $3^{rd}$ base, short stop, catcher, pitcher, right fielder, center fielder, left fielder, to name a few. It should be noted that the roster grid may be provided for other fantasy sports draft or for actual sports draft or any other transaction/trade. Thus, if the auction draft is for a fantasy football, the eligible positions may include tackle, guard, center, quarterback, fullback/running back, halfback/running back, wide receiver, to name a few. In addition to the eligible positions listed along various rows, the roster grid may include the minimum requirements for each eligible position that needs to be filled in each team to complete the requirements of the team in the league. This information would be obtained from the league rules module of the draft application.

The dynamic portion of the roster grid includes dynamic attributes of both the teams and the players nominated for draft that change during the course of the draft. Some of the dynamic attributes associated with the teams include number of eligible positions that are filled for a team, current budget balance, current bid value of a team participating in the draft, number of slots for each eligible position filled within the roster grid, scarcity value of each team for each eligible position, etc. The dynamic attributes of the teams may be rendered alongside the respective team's static attributes or separately. Similarly, the dynamic attributes of each player may include current team associated with the player, one or more player statistics, additional attributes computed using one or more static attributes and/or dynamic attributes, such as projected value for the player, average value of a player for the eligible position, etc. The list of static attributes, dynamic attributes and additional attributes of the teams and players are exemplary and should not be considered exhaustive. Consequently, additional static, dynamic or additional attributes of the team/player may also be included in each of the cells in the roster grid to provide a more comprehensive view of the status of the teams and the players in each of the teams in the league.

Each cell associated with the eligible positions also includes appropriate cell indicator to reflect the current status of the team for the specific eligible position. As and when a team successfully drafts a player, the appropriate cells in the roster grid are dynamically updated to reflect the current status of the team. Along with the dynamic update of appropriate cells, the cell indicators of the appropriate cells are also dynamically updated to reflect the current status of the teams. The roster grid may also provide indicators to identify a particular team manager that is nominating a particular player currently being drafted, as illustrated by cell 155, a team manager that presented a winning bid upon successful drafting, a team manager that has currently provided the highest bid amount for the nominated player during the draft, as illustrated by cell 156, a set of team managers that have placed the most recent bids for the nominated player, as illustrated by box 157, etc. In addition to providing the status of the number of eligible positions that have been currently drafted, the roster grid also provides information on which teams have placed bids, budget value remaining for each team, etc., to help in developing strategies for the teams during the draft process.

In addition to the roster grid 150, the roster grid generator may provide additional information associated with a player or the draft. In one embodiment, information related to a player that is currently being drafted or "on-the-block" is provided, as a player information box 160, alongside the roster grid. The statistics may include a plurality of player attributes, such as player name, eligible position(s) played by the player, team that the player is currently representing, average performance statistics, etc. The projected value of a player, in one embodiment, may be dynamically computed for the player on the block as a function of scarcity value, budget and need of the teams in the league. In one embodiment, the scarcity value may be defined as a ratio of number of players qualified to play the eligible position(s) played by the nominated player to the number of open slots for the eligible position waiting to be filled by the plurality of teams. Thus, as illustrated in FIG. 3A, when Michael Young is "on-the-block", the draft application will provide his attributes including, but not limited to, current team he is affiliated with, eligible position he plays, his statistics for the eligible position, etc. In addition to his player attributes, additional attributes, such as his projected value, average bid, scarcity score, etc., computed using his player attributes and attributes of all the teams in the league are also rendered, in the player information box 160.

The player information box 160 may additionally include bidding information obtained from auction interface module. The auction interface module obtains team information from the league teams database and player information from the player stats database. Each team may also provide information for the auction draft of a player by setting maximum bid value that the team is willing to bid through an "autobid" option. The auction information rendered in the information box 160 is similar to the ones rendered by any live auction application, and hence has not been discussed in detail.

A team manager can research any player to determine the player's statistics. The player's statistics 160-A are rendered alongside the roster grid so as to allow a team to research a player that is currently being drafted or that is nominated or will be potentially nominated for subsequent draft and provides information associated with the specific player. Information associated with the specific player includes the specific player's attributes. In order to determine which player to research on, a list of players in the league are provided and a user can view the list by selecting an "All Players" tab in 160-A. When a user selects a particular player to research on, one or more player attributes or additional attributes for the selected player are rendered, as illustrated in 160-A. In one embodiment, the draft application may dynamically rank all the players in the league based on the players' statistics and present the ranked list of players for a user to research on.

Additional tools/options may be provided to assist a user in obtaining specific information on a player or team. In one embodiment, one of the tools/options that is provided is a "Search by Player" button 160-A1, to enable a user to search a specific player in the league for research. A user may be provided with another tool, such as a Nomination queue 160-D, to enable a user to view, add or remove one or more players from the nomination player list. The nomination player list includes players that have been nominated by plurality of team managers and is updated during the draft process. Additionally, the player that is currently being drafted is selected from the nomination list. In addition to conducting research on a player, the roster grid generator provides an option to view status of user's own team. A user participating in the auction draft assumes the role of a specific team's manager and performs actions similar to a real team manager during the auction draft. A "My Team" option, as shown in box 160-B enables a user at a client on which the roster grid is rendered to review his team's details in the draft. A team's status and standing in the draft provided in the "my team" option 160-B is analogous to the particular user's team status provided in the roster grid. A "Draft Results" option in box 160-B provides results from the draft. Additional tools include a chat option 160-C to enable a team manager (user) of a specific team in the league to chat with other team managers (users) during the draft. The draft application may use pre-defined applications modules or sub-routines or generate a custom module/sub-routine to define and provide the above listed tools. The team managers listed for each team as illustrated in the fantasy baseball auction draft may be obtained from League Teams database and may reflect the actual team manager of a real live team for the specific sport of baseball. It should be noted that the above list of additional tools that are discussed with reference to FIG. 3A are exemplary and should not be considered restrictive. Other tools may be provided in place of or in addition to the tools illustrated in FIG. 3A.

Returning to the roster grid, when a particular player is on-the-block, the specific row(s) row indicator 158 depicting the eligible position(s) played by the player on-the-block will be activated so that a user's focus is drawn to the eligible position for which the player is currently being drafted. The highlighted row would enable a user to quickly scan the row to determine the status of other teams with respect to the eligible position so that the user, as a team manager, can analyze the demand for the particular player based on the status of all the teams for the eligible position(s), scan the projected value and determine his/her bidding strategy during the auction draft. Thus, as illustrated in FIG. 3A, when Michael Young is on-the-block, the row indicator for the row associated with the eligible position that he plays, i.e., third base, is activated, as shown by box 158 across all the teams in the roster grid so that the user can quickly scan the cells across the row and strategize during the draft. The roster grid illustrated in FIG. 3A shows an expanded view with all the rows and all the columns rendered during the draft. As mentioned, other customized views may be pre-generated and dynamically rendered based on users requests for the specific views or may be dynamically generated based on each user's request and rendered in substantial real-time during the draft so that the user can make quick, informed decision as the draft progresses. Thus, the roster grid provides a comprehensive view of the status of each team in a league during an actual draft so that a user can quickly view the status of each team, statistics of the player currently on-the-block and make smart, informed, and quick decision in drafting the player.

Figure 5:
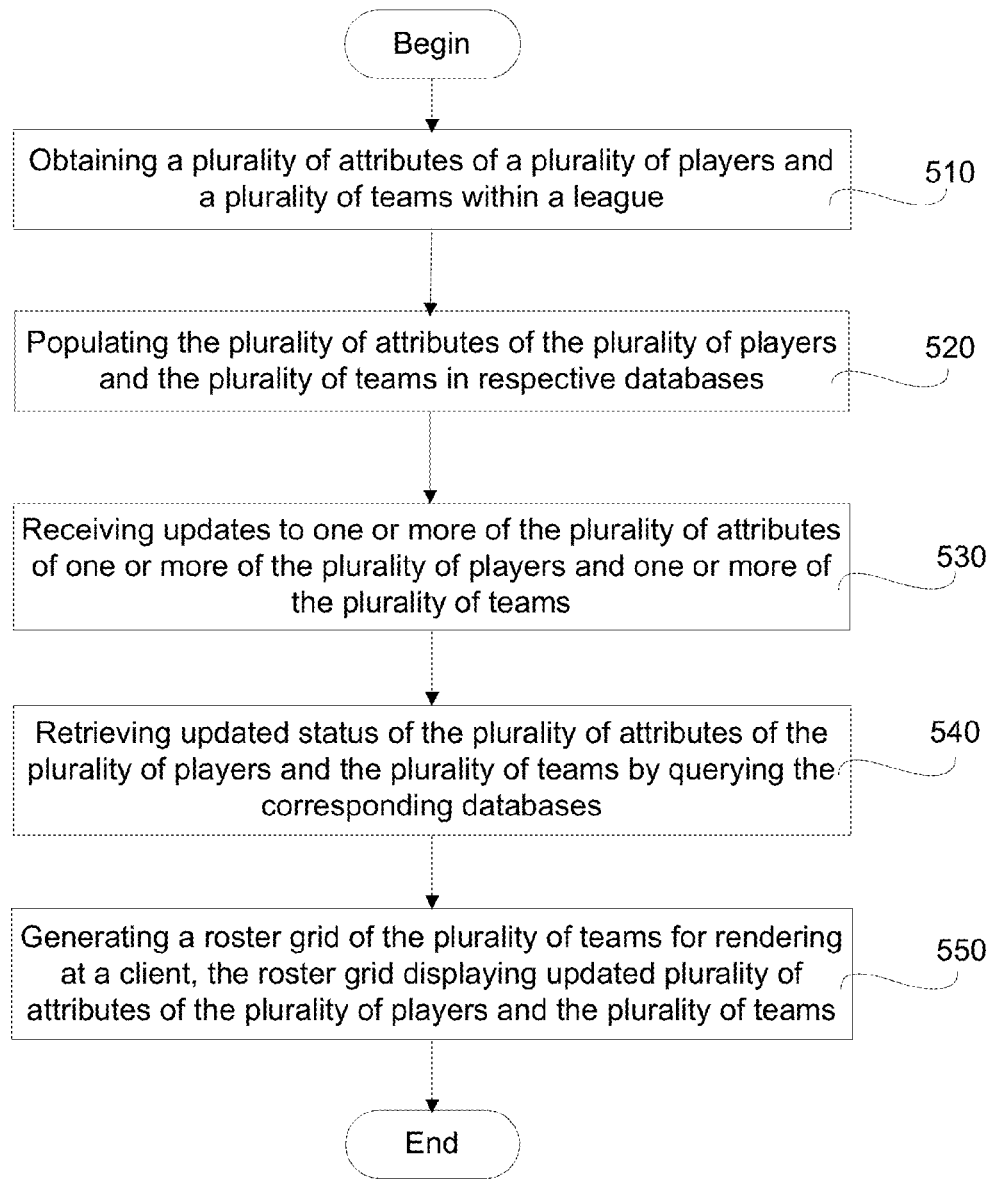
FIG. 5 illustrates a process flow diagram for generating a roster grid, in accordance with one embodiment of the invention.

With the above general understanding of the various embodiments, a method for providing a roster grid for a plurality of teams that are part of a league will now be described with reference to FIG. 5. FIG. 5 illustrates the method operations for providing the roster grid for the plurality of teams in the sport league for a particular sport. The process begins at operation 510 when a plurality of attributes of the plurality of players and a plurality of teams belonging to a league are collected from various sources using a draft application. The draft application receives attributes and updates to attributes for the teams and players from various sources such as CNN™, Yahoo!™ Sports, ESPN™, etc. The plurality of attributes for players received from various sources are populated on to a player stats database and the plurality of attributes for the teams are populated onto a league teams database, as illustrated in operation 520. In one embodiment, the attributes of the players and teams are populated in the respective databases periodically. Updates to the one or more attributes of teams and/or players are made at the respective databases in substantial real time, as illustrated in operation 530, so as to maintain and provide up-to-date information on the teams and players of the sports league. The updated databases are queried by a roster grid application to obtain up-to-date attributes of the players and teams, as illustrated in operation 540. The roster grid application (draft application) may receive a request from a client for information associated with the players and teams and in response, queries the corresponding databases to obtain the players and teams attributes. The request may include the type of roster grid view and information associated with a client, such as client ID, client location, etc. The draft application then generates a roster grid, as illustrated in operation 550. The roster grid provides information associated with each of the players and the teams in the league and is generated in accordance with the type of view requested by the client. Thus, for instance, the roster grid may include an expanded view or may only include information associated with specific teams and/or specific positions of the teams. The generated roster grid is returned to the client for rendering in response to the request.

As mentioned earlier with respect to FIGS. 3A-3C, the generated roster grid may include control options to collapse or expand selective portions of the roster grid rendered at the client. A user at the client may use the information provided in the roster grid to strategically place subsequent bids on a nominated player during an auction draft. Information from the subsequent bids at the client are received in substantial real time at the draft application on the server and updated to the respective databases. Any updates to the teams and/or the players from the auction draft process are also updated to the respective cells at the rendered roster grid in substantial real time. The draft application also updates the cell indicators of the respective cells affected by the updates to reflect the changes. The draft application may use information provided by the league rules module and display indicator control to provide necessary league related information and indicator related information to the roster grid. Based on the information provided in the roster grid, the teams can decide on which player to bid, how much to bid and when to bid during the auction draft.

Figure 6:
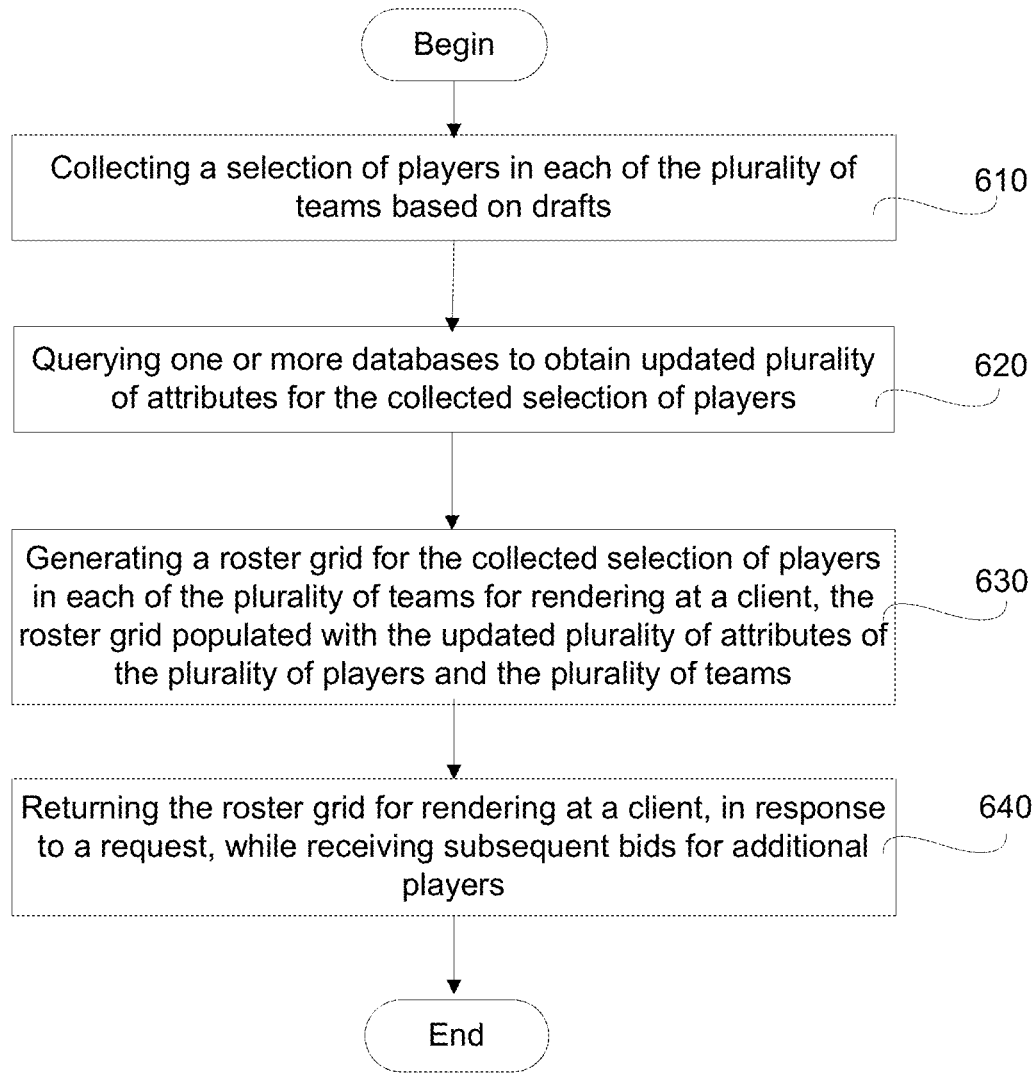
FIG. 6 illustrates an alternate process flow diagram for presenting a plurality of attributes of a plurality of players and teams, in one embodiment of the invention.

FIG. 6 illustrates an alternate embodiment of a method for presenting a plurality of attributes for a plurality of players and teams for a fantasy sport. The method begins at operation 610 wherein a selection of players in each of the plurality of teams are collected based on one or more drafts. In one embodiment, the selected players for each team include players that were drafted and players that were pre-assigned to a team. Based on the selection of players, a plurality of attributes for the selected players are obtained, as illustrated in operation 620. The attributes of the players are obtained from a player stats database that is maintained and made available to the draft application at the server. The player stats database, in turn, receives information from various sources. In addition to the players attributes, the draft application may query and obtain team attributes for the various teams in the league related to the selected group of players from a league team database. As is the case with the player stats database, the team database obtains information from various sources, including sports media, league rules, etc. The draft application uses the attributes of the selected players in each of the teams to generate a roster grid, as illustrated in operation 630.

Some of the teams and players attributes are used to populate the static portion of the roster grid and some of the players and teams attributes are used to populate the dynamic portion of the roster grid. In addition to the players attributes and teams attributes, additional attributes associated with the players are computed using one or more of the teams and players attributes. The additional attributes are also presented alongside the players and teams attributes in or alongside the roster grid. The draft application generates the roster grid in accordance with a type of roster grid view requested by the client. In one embodiment, the draft application generates the roster grid specific to the client's request. In another embodiment, the draft application generates a plurality of pre-defined roster grid views and transmits the specific ones of the roster grid views to the client based on the request from the client. It should be noted herein that different clients may request different roster grid views and the draft application will cater to each of the requests by generating and returning the appropriate roster grid views to the respective clients. The process concludes with the transmission of the appropriate roster grid view to the client for rendering, as illustrated in operation 640. The roster grid view returned by the draft application is rendered at the client while subsequent bids for other players in the league are entertained during the auction draft. The results of the subsequent bids are updated to the appropriate databases dynamically and to the appropriate cells at the rendered roster grid. The information in the rendered roster grid is used during subsequent bids during the current auction draft process. In addition to the updated status of the players and teams, the draft application dynamically updates the various cell indicators and row indicators to indicate the current status of the teams and players. As has been mentioned earlier, a player can play more than one eligible position in the team. In one embodiment, during the auction draft process of a nominated player, the indicators for the appropriate row(s) associated with the eligible position(s) played by the nominated player may be activated. The activation of the row indicator for the eligible position(s) enables the team manager to focus on the specific row(s) for all teams so that the team manager may be able to compare the status of the various teams and present informed bids during the auction draft process. The process of presenting and updating the attributes of the players and teams continues till all the teams have successfully drafted all the players in the league.

As can be seen from the above description of the various embodiments, the draft application provides a comprehensive view of all the teams and players in the league in the form of a roster grid and uses the roster grid to determine and analyze the various attributes of players and teams so as to strategically bid on the players for eligible positions during the auction draft process. Due to the time-sensitive nature of the auction draft, the comprehensive roster grid provides the necessary information of all the teams and positions in the league in a single screen so as to allow a team manager to quickly review the status of the various teams and eligible positions during the draft process. Additional attributes and information are provided to further aid the team managers in the draft process. Other advantages of the roster grid may be easily envisioned by one skilled in the art.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method, comprising:
    obtaining attributes of athletic players from one or more sources, the attributes defining statistics of the athletic players;
    determining minimum requirements for teams organized in a group; and
    generating a listing for providing attributes related to every team in the group in a grid format for rendering at a display during a drafting process, the listing having a plurality of entries, each of the plurality of entries configured to present attributes of an athletic player in rows of the grid format or attributes of a team that is part of the group in columns of the grid format,
    wherein the listing includes select ones of the plurality of entries that are static and select ones of the plurality of entries that are dynamic, the entries that are static are used to provide minimum requirements defined for each team in the group and the entries that are dynamic are used to provide the attributes of the athletic players, the entries that are dynamic being adjusted during the drafting process to provide current status of the teams and the athletic players.

2. The method of claim 1, wherein determining minimum requirements includes querying rules for the group in which the teams are members, the rules identifying minimum requirements related to the athletic players that need to be satisfied by each team organized in the group, during the drafting process.

3. The method of claim 1, wherein generating a listing further includes,
    generating a customized listing with select ones of the plurality of entries rendering current status of select ones of the teams and select ones of the athletic players within the select teams in response to specified viewing preference.

4. The method of claim 3, wherein the viewing preference identifies select ones of the athletic players to be rendered in the listing based on one or more positions played by the athletic players.

5. The method of claim 3, wherein the viewing preference identifies select ones of the teams for select positions played by the select ones of the athletic players.

6. The method of claim 1, wherein generating a listing further includes,
    providing an expansion option at each of the plurality of entries within the listing, wherein the expansion option is configured to allow rendering of additional attributes of the select ones of the athletic players or select ones of the teams; and
    providing a minimize option at each of the plurality of entries within the listing, wherein the minimize option is configured to allow rendering of minimal attributes of the select ones of the athletic players or select ones of the teams.

7. The method of claim 1, further includes providing visual indicators at each of the plurality of entries, the visual indicators dynamically adjusted during the drafting process to provide current status of the athletic players and teams in the group.

8. The method of claim 1, further includes dynamically computing secondary attributes for the athletic players using the attributes of the athletic players; and
    dynamically computing secondary attributes for the teams in the group using the attributes of the teams in the groups,
    wherein the secondary attributes of the athletic players and the teams rendered at corresponding entries in the listing.

9. A system, comprising:
    a memory to store programming logic of an application used to provide a listing for teams organized in a group and to store team statistics for the teams in the group; and
    a processor for executing the application used for providing the listing for the teams, the application includes,
    (a) a draft module configured to,
    interact with one or more sources over a network to obtain attributes of athletic players, wherein the attributes define statistics of the athletic players;
    obtain minimum requirements for the teams by querying the team statistics of the teams stored in the memory; and
    (b) a listing generator module configured to generate a listing for providing attributes related to every team in the group in a grid format for rendering at a display during a drafting process, wherein the generated listing includes a plurality of entries with each entry configured to present attributes of an athletic player in rows of the grid format or attributes of a team in the group in columns of the grid format, select ones of the plurality of entries being static and select ones of the plurality of entries that are dynamic, the entries that are static are configured to provide minimum requirements defined for each team in the group and the entries that are dynamic are configured to provide attributes of the athletic players, the entries that are dynamic are configured to be adjusted during a drafting process to provide current status of the teams and the athletic players.

10. The system of claim 9, wherein the listing generator module is further configured to provide visual indicators for each of the plurality of entries, the visual indicators configured to be dynamically adjusted during the drafting process to provide current status of the athletic players and teams in the group.

11. A computer program stored in a non-transitory computer-readable medium, the computer program having instructions which, when executed by a computer, performs a method, the computer program comprising:

program instructions for obtaining attributes of athletic players from one or more sources, the attributes defining statistics of the athletic players;

program instructions for determining minimum requirements for teams organized in a group; and program instructions for generating a listing for for providing attributes related to every team in the group in a grid format for rendering at a display during a drafting process, the listing having a plurality of entries, each of the plurality of entries configured to present attributes of an athletic player in rows of the grid format or attributes of a team that is part of the group in columns of the grid format, wherein the listing includes select ones of the plurality of entries that are static and select ones of the plurality of entries that are dynamic, the entries that are static are used to provide minimum requirements defined for each team in the group and the entries that are dynamic are used to provide the attributes of the athletic players, the entries that are dynamic being adjusted during the drafting process to provide current status of the teams and the athletic players.

12. The computer program of claim 11, wherein program instructions for generating the listing further includes, program instructions for providing an expansion option at each of the plurality of entries within the listing, wherein the expansion option is configured to allow rendering of additional attributes of the select ones of the athletic players or select ones of the teams rendered in the entry; and program instructions for providing a minimize option at each of the plurality of entries within the listing, wherein the minimize option is configured to allow rendering of minimal attributes of the select ones of the athletic players or select ones of the teams rendered in the entry.

13. The computer program of claim 11, further includes program instructions for providing visual indicators at each of the plurality of entries, the visual indicators dynamically adjusted during the drafting process to provide current status of the athletic players and teams in the group.

14. The computer program of claim 11, further includes program instructions for dynamically computing secondary attributes for the athletic players using the corresponding attributes of the athletic players; and dynamically computing secondary attributes for the teams in the group using the corresponding attributes of the teams in the groups, wherein the secondary attributes of the athletic players and the teams rendered at one or more of the plurality of entries in the listing.

15. The method of claim 1, wherein the entries that are dynamic are used to provide current attributes of the teams that are part of the group.

16. The system of claim 9, wherein the entries that are dynamic are further configured to provide current attributes of the teams that are part of the group.

17. The computer program of claim 11, wherein the entries that are dynamic are further configured to provide current attributes of the teams that are part of the group.

* * * * *